(12) United States Patent
Rigault

(10) Patent No.: US 10,138,989 B2
(45) Date of Patent: Nov. 27, 2018

(54) STEERING SYSTEM WITH LOW-BULK MECHANICAL DIFFERENTIAL

(71) Applicant: NEXTER SYSTEMS, Roanne (FR)

(72) Inventor: Guillaume Rigault, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 190 days.

(21) Appl. No.: 15/353,148

(22) Filed: Nov. 16, 2016

(65) Prior Publication Data

US 2017/0159788 A1 Jun. 8, 2017

(30) Foreign Application Priority Data

Dec. 3, 2015 (FR) ..................................... 15 02520

(51) Int. Cl.
*F16H 48/30* (2012.01)
*F16H 48/36* (2012.01)
*F16H 37/08* (2006.01)
*F16H 48/08* (2006.01)

(52) U.S. Cl.
CPC ........... *F16H 48/36* (2013.01); *F16H 37/082* (2013.01); *F16H 48/08* (2013.01); *F16H 2048/364* (2013.01)

(58) Field of Classification Search
CPC ........ F16H 48/36; F16H 48/08; F16H 37/082; F16H 2048/364

USPC ............................ 475/5, 150, 204, 331, 903
See application file for complete search history.

(56) References Cited

U.S. PATENT DOCUMENTS 5,106,353 A * 4/1992 Ra ........................... F16H 3/721
475/269
2010/0234162 A1 9/2010 Troennberg

FOREIGN PATENT DOCUMENTS

JP 2009133426 6/2009

OTHER PUBLICATIONS

French Search Report for corresponding French Application No. 1502520.

* cited by examiner

*Primary Examiner* — Jeffrey A Shapiro
(74) *Attorney, Agent, or Firm* — Hauptman Ham, LLP

(57) ABSTRACT

The present invention relates to a low-bulk steering system with mechanical differential for eliminating at least some of the disadvantages of the prior art by proposing a steering system with mechanical differential having architecture proposing reduced bulk in particular in the axis of the wheels enabling installation in vehicles having a smaller path.

5 Claims, 2 Drawing Sheets

STEERING SYSTEM WITH LOW-BULK MECHANICAL DIFFERENTIAL

TECHNICAL FIELD OF THE INVENTION

The invention relates to the field of steering systems with mechanical differential, in particular for vehicles.

PRIOR ART

The differentials are mechanical systems comprising an input member and at least two output members the function of which is to ensure distribution of speed of rotation by distribution of the kinematic force and speeds of rotation, in an adapted, immediate and automatic manner, to needs of a mechanical assembly. One of the most current examples of use is in the scope of automobile vehicles where the differential lets the drive wheels turn at different speeds when the vehicle is negotiating a curve. The wheels which are located outside the turn are compelled to turn faster than those which are located inside the turn. This difference in rotation between the two output members, or between at least one output member and the input member, is called differential speed, since the speeds of rotation of the different members of the differential are different.

Conventional differentials generally divide torque equally between the drive wheels. But for optimal control of the vehicle, the drive wheel outside the turn should offer more torque than the drive wheel inside the turn. In fact, the increase in torque applied to the drive wheel outside the turn contributes to propelling and directing the vehicle in the turn and this is particularly beneficial in turns negotiated at high speed.

Also, traction can vary between the drive wheels. If traction under one of the drive wheels is low enough, as for example on ice, the differential distributes torque such that the wheel having the lowest traction turns, while the other wheel with better traction stays at rest.

It was possible to compensate this shortcoming by the development of limited-slip differentials, disposed to enable detection of a difference in torque between the two output axes and restrict the action of the differential in the case of insufficient adherence on one of these two output axes.

But, this type of limited-slip differential tends to drive the two drive wheels at the same speed, which impairs maneuverability, in particular in turns, when the vehicle is moving rapidly. Several solutions have been put forward to rectify this problem.

U.S. Pat. No. 8,388,480 proposes a steering system of a bevel differential by means of an epicyclic gear train whereof the outputs are secured to a planet carrier of the bevel differential, to one of the wheels of the vehicle and to a steering motor. The entire system is installed in the axis of the wheels and needs to have a wide path between the drive wheels.

Application DE102006022174 proposes a steering solution of a bevel differential by use of two epicyclic gear trains, one for each output of the bevel differential. In this way, the axis of the planet carrier is connected to the cage of the differential, the ring gear is secured to the output of the differential and the sun gear is secured to a brake. Steering is performed by braking of one or the other sun gear. This type of system is once again particularly adapted to vehicles having a wide track since it is installed on the axis of the wheels.

U.S. Pat. No. 7,311,631 as such proposes a steering solution of a bevel differential by use of two epicyclic gear trains sharing the same ring gear. The sun gear of the first train is secured to one of the wheels of the vehicle and that of the second is secured to the planet carrier of the bevel differential. Steering is performed by rotating of the planet carrier of the second train, that of the first being fixed. Here too this entire system is installed in the axis of the wheels, implying considerable bulk along this axis. Also, the second disadvantage of this type of architecture is the large number of parts, increasing costs but also the risk of inviting mechanical problems.

Placing such a system in the axis of the wheels also results in shortening of the connecting rods of the constant-velocity transmission joints (universal joints), resulting in excessive angles between the input and output connecting rods of these joints, which increases the forces they must undergo.

DISCLOSURE OF THE INVENTION

The aim of the present invention therefore is to propose a low-bulk mechanical differential for eliminating at least some of the disadvantages of the prior art by proposing a steering system with mechanical differential having an architecture proposing reduced bulk in particular in the axis of the wheels to reduce forces undergone by the constant-velocity transmission joints. The invention can be installed in vehicles having a path which can vary from 2.5 meters (4×4 vehicles) to more than 3 meters (8×8 vehicles).

For this purpose, the invention relates to a differential steering system comprising:
  an input shaft (A) comprising
    at its end a first bevel gear (1) secured to the input shaft (A), and
    an epicyclic gear train comprising:
      a second sun gear (2) secured to the input shaft (A),
      at least three planet gears (3) cooperating with the second sun gear (2) and secured together by a planet carrier (11) on which they are pivotably mounted, and
      a ring gear (4) cooperating with the at least three planet gears (3),
    a third bevel gear (5) freely rotating about the input shaft (A), located between the second sun gear (2) and the first bevel gear (1),
  a first output shaft (B) comprising:
    a fourth bevel gear (6) secured to the first output shaft (B) and cooperating with the third bevel gear (5) rotatably mounted about the input shaft (A), and
    at its end a fifth bevel gear (7) incorporated into differential means (Δ) and secured to the first output shaft (B),
  a second output shaft (C) comprising:
    at its end a sixth bevel gear (8) secured to the second output shaft (C) and incorporated into the differential means (Δ), and
    a seventh bevel gear (9) freely rotating about the second output shaft (C), the seventh bevel gear (9) cooperating with the first bevel gear (1) secured to the input shaft (A), the seventh bevel gear (9) being secured to a planet carrier cage (D) of the differential means (Δ),
  the planet carrier cage (D) of the differential means (Δ) comprises within it at least one eighth bevel gear (10) separately mounted on an axis (E, F) perpendicular to the axes (C, B), and cooperating simultaneously with the fifth and sixth bevel gears (8, 7), the planet carrier cage (D) of the differential means (Δ) being mounted freely rotating about the first output shaft (B) and second output shaft (C), characterized in that the ring gear (4) is secured to the third bevel gear (5) freely rotating about the input shaft (A), the rotation of the third gear (5) modulating the relative speeds of rotation of the first (B) and second (C) output shafts which are also driven in rotation by the differential means (Δ).

In this way, the steering system is based on the use of a bevel differential whereof the speed is steered by a cascade of gears by means of an epicyclic gear train disposed in the longitudinal axis of the vehicle. Such architecture makes for easy integration of the steering system in all types of vehicles and reduces the forces undergone by the constant-velocity transmission joints.

According to a particular feature, the rotation and the direction of rotation of the planet carrier (11) are controlled by a motor (12), preferably an electric, hydraulic or pneumatic motor.

According to another particular feature, the dimensions of the different gears are selected so that the planet carrier (11) is substantially stationary when the first and second output shafts (B, C) have identical direction and speed of rotation.

In this way, in a straight line, the steering speed is almost zero, i.e., the motor does not turn or barely turns. The preferred aim is specifically to mechanically stress the motor (12) less, which increases the steering precision. If the speed of rotation of the motor (12) remains moderate in a straight line, it is possible to dispose at the output of the motor (12) a reducer having a substantial reduction ratio, which will have the motor (12) work with weaker torque. Even if it is possible theoretically to execute the invention with a motor (12) turning at any speed, it is clear that if the speed of rotation of the motor (12) in a straight line stays for example under 10% of its maximum speed of rotation, it will be possible to greatly boost this speed to make the preferred corrections. The real values of the speeds will clearly depend on the characteristics (mass, geometry, power of motorization) of the relevant vehicle and it is not possible to specify that here.

Advantageously, the dimensions of the first, second, third, fourth and seventh gears (1, 2, 5, 6 and 9) and of the ring gear (4) are selected to satisfy approximately +/−N % the following equation: $Z_2 \cdot Z_9 \cdot Z_5 = Z_1 \cdot Z_6 \cdot Z_4$.

with
$Z_1$ the number of teeth of the first gear (1)
$Z_2$ the number of teeth of the second gear (2)
$Z_4$ the number of teeth of the ring gear (4)
$Z_5$ the number of teeth of the third gear (5)
$Z_6$ the number of teeth of the fourth gear (6)
$Z_9$ the number of teeth of the seventh gear (9)
N being less than or equal to 10%.

BRIEF DESCRIPTION OF THE FIGURES

Other characteristics, details and advantages of the invention will emerge from the following description in reference to the appended figures.

DETAILED DESCRIPTION OF DIFFERENT EMBODIMENTS OF THE INVENTION

Many combinations can be possible without departing from the scope of the invention. The skilled person will select one or the other as a function of economic, ergonomic, dimensional constraints or others he is to respect.

Figure 1:
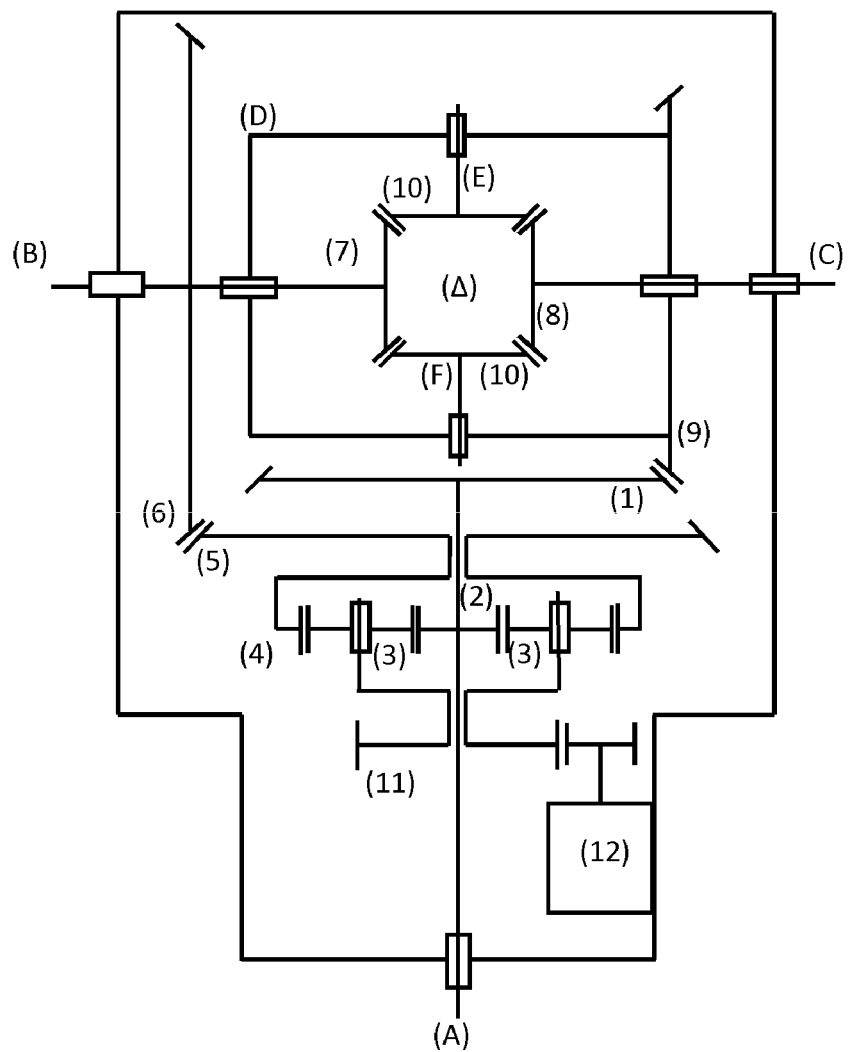
FIG. 1 is a schematic representation of the system
Figure 2:
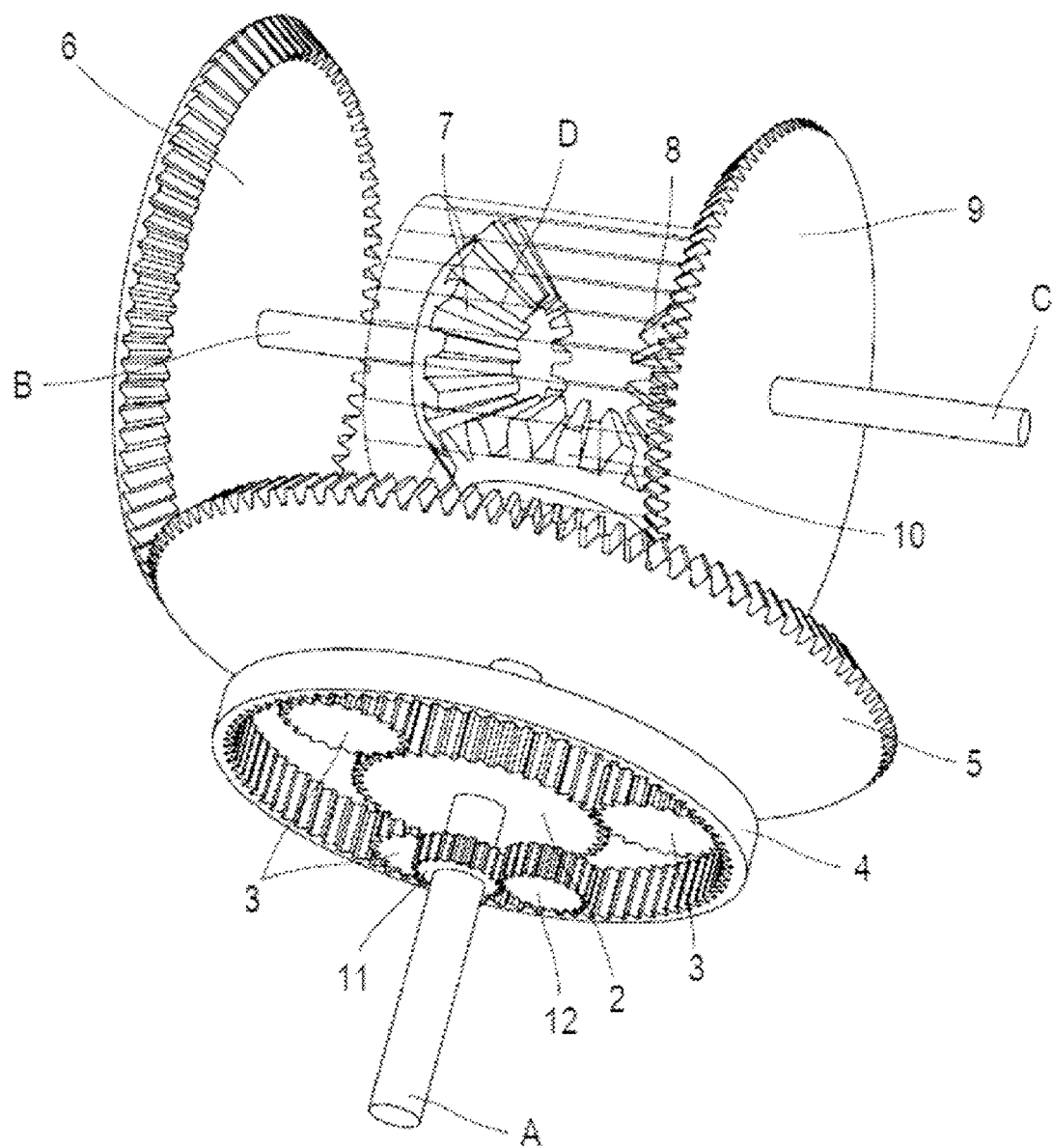
FIG. 2 is a 3D representation of the system

More particularly, FIGS. 1 and 2 illustrate a preferred though non-limiting embodiment of the present invention.

A differential steering system comprising:
an input shaft (A) comprising
at its end a first bevel gear (1) secured to the input shaft (A), and
an epicyclic gear train comprising:
a second sun gear (2) secured to the input shaft (A),
at least three planet gears (3) pivotably mounted on a planet carrier (11) cooperating with the second sun gear (2) and pivotably mounted on a planet carrier (11) steered directly or indirectly by a motor (12), preferably an electric motor, and
a ring gear (4) cooperating with the at least three planet gears (3),
a third bevel gear (5) freely rotating about the input shaft (A), located between the second sun gear (2) and the first bevel gear (1), the third bevel gear (5) being secured to the ring gear (4),
a first output shaft (B) comprising:
a fourth bevel gear (6) secured to the first output shaft (B) and cooperating with the third bevel gear (5) rotatably mounted about the input shaft (A), and
at its end a fifth bevel gear (7) incorporated into differential means (Δ) and secured to the first output shaft (B),
a second output shaft (C) comprising:
at its end a sixth bevel gear (8) secured to the second output shaft (C) and incorporated into the differential means (Δ), and
a seventh bevel gear (9) freely rotating about the second output shaft (C), the seventh bevel gear (9) cooperating with the first bevel gear (1) secured to the input shaft (A), the seventh bevel gear (9) being secured to a planet carrier cage (D) of the differential means (Δ),
the planet carrier cage (D) of the differential means (Δ) comprises within it at least one eighth bevel gear (10) cooperating simultaneously with the fifth and sixth bevel gears (7, 8), the planet carrier cage (D) of the differential means being mounted freely rotating about the first and second output shafts (B) and (C), In this way, when such a system is used in a vehicle, the main motor of the vehicle supplying rotation of the input shaft (A) causes the first gear (1) to turn, which drives the planet carrier cage (D) of the differential means (Δ) by means of cooperation with the seventh bevel gear (9) coaxially and rotatably mounted on the output axes (B, C) and secured to the cage (D). The differential means (Δ) comprise the cage (D), the eighth bevel gears (10) and the fifth and sixth bevel gears (7, 8).

In conventional terms in a differential, rotation of the eighth bevel gear (10) relative to the planet carrier cage (D) is performed as a function of the left right speed differential related to a turn. In a particular embodiment, the planet carrier cage (D) comprises two bevel gears (10) mounted secured to the axes (E, F) pivotably mounted on the cage (D) in a direction perpendicular to the axes (B, C). When the vehicle travels in a straight line the wheels secured to the axes (B) and (C) are driven at the same speed by the main motorization of the vehicle which drives the input shaft (A). Rotation is communicated to the wheels via the cage (D) which drives the bevel gears (10) which in turn drive the fifth and sixth bevel gears (8, 7).

When the aim is to modify the speed difference between the axes (B) and (C), the motor (12) is actuated, acting on the axis (B) by means of the ring gear (4). This results in modification of the ratios of speed of rotation between the left wheel and the right wheel relative to what is proposed automatically by the differential (Δ) alone. Such an arrangement improves control of the vehicle in the turns by avoiding in particular oversteering or understeering. The wheels are respectively connected to the first and second output shafts (B and C).

In particular, the wheel of the first output shaft is driven both by the sixth bevel gear (7) and by rotating of the fourth bevel gear (6) cooperating with the third bevel gear (5) freely rotating about the input shaft (A). The third bevel gear (5) meshes by means of the ring gear (4) with the epicyclic gear train whereof the sun gear (2) is secured to the input shaft (A) receiving the driving force and whereof the satellites (3) are pivotably mounted on a planet carrier (11) in turn driven by the electric motor (12).

In a particular embodiment, the dimensions of the different gears are selected so that the motor (12) steering the planet carrier (11) is almost idling when the vehicle moves in a straight line, therefore when the first and second output shafts (B, C) have identical direction and speed of rotation. The aim of such an arrangement is to decrease the power consumed by the motor (12) as well as the necessary power. This aim is a theoretical aim. It is clear that mechanical design considerations tend to tolerate a certain spread between the dimensions of the gears resulting in slight rotation of the motor (12), even in a straight line.

More particularly, in a preferred embodiment, the dimensions of the first, second, third, fourth and seventh gears (1,2, 5, 6 and 9) and of the ring gear (4) are selected to satisfy the following equation: $Z_2 \cdot Z_9 \cdot Z_5 = Z_1 \cdot Z_6 \cdot Z_4$ with:

$Z_1$ the number of teeth of the first gear (1)
$Z_2$ the number of teeth of the second gear (2)
$Z_4$ the number of teeth of the ring gear (4)
$Z_5$ the number of teeth of the third gear (5)
$Z_6$ the number of teeth of the fourth gear (6)
$Z_9$ the number of teeth of the seventh gear (9)

This theoretical condition will be required at approximately +/−N %, i.e., $Z_2 \cdot Z_9 \cdot Z_5 = Z_1 \cdot Z_6 \cdot Z_4 \times (1 +/- N\%)$ with N less than or equal to 10%

By way of example, the dimensions of the different elements of the system can be the following:

first gear (1): diameter $D_1$=72 mm, number of teeth $Z_1$=24,
second gear (2): diameter $D_2$=63 mm, number of teeth $Z_2$=21,
planet gears (3): diameter $D_3$=51 mm, number of teeth $Z_3$=17,
ring gear (4): diameter $D_4$=165 mm, number of teeth $Z_4$=55,
third gear (5): diameter $D_5$=207 mm, number of teeth $Z_5$=69,
fourth gear (6): diameter $D_6$=162 mm, number of teeth $Z_6$=54,
fifth gear (7): diameter $D_7$=51 mm, number of teeth $Z_7$=17,
sixth gear (8): diameter $D_8$=51 mm, number of teeth $Z_8$=17,
seventh gear (9): diameter $D_9$=147 mm, number of teeth $Z_9$=49,
eighth gear (10): diameter $D_{10}$=54 mm, number of teeth $Z_{10}$=18, and
planet carrier (11): diameter $D_{11}$=105 mm, number of teeth $Z_{11}$=35.

This results in: $Z_2 \cdot Z_9 \cdot Z_5 = 21 \times 49 \times 69 = 71001$ and $Z_1 \cdot Z_6 \cdot Z_4 = 24 \times 54 \times 55 = 71280$. Let there be a difference of around 4% between the two expressions.

This limits the speed of the motor (12) when the vehicle progresses in a straight line. This stresses the motor (12) mechanically much less, which increases the steering precision. A speed of rotation of the motor (12) moderated in a straight line also has a reducer having a considerable ratio of reduction at output of the motor (12), which has the motor (12) work with lower torque. A difference of the order of +/−10% on the preceding ratios dimensions the motor (12) reasonably, while having strong capacity for corrections of the operation of the differential (oversteer or understeer correction).

It is easily understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

So the skilled person could adapt the size of the system to his use by following a simple rule of proportionality without departing from the scope of the invention.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

It must be evident for skilled persons that the present invention enables embodiments in many other specific forms without distancing them from the field defined by the scope of the appended claims, and they must be considered by way of illustration and the invention must not be limited to the details given hereinabove.

The invention claimed is:

1. A differential steering system comprising:
   an input shaft comprising at an end a first bevel gear secured to the input shaft, and
   wherein the input shaft also comprises:
      an epicyclic gear train comprising:
         a second sun gear secured to the input shaft,
         at least three planet gears cooperating with the second sun gear and secured together by a planet carrier on which they are pivotably mounted, and
         a ring gear cooperating with the at least three planet gears,
      a third bevel gear freely rotatable about the input shaft, located between the second sun gear and the first bevel gear,
   the differential steering system also comprising:
      a first output shaft comprising:
         a fourth bevel gear secured to the first output shaft and cooperating with the third bevel gear rotatably mounted about the input shaft, and
         at an end a fifth bevel gear incorporated into the differential means and secured to the first output shaft,
      a second output shaft comprising:
         at an end a sixth bevel gear secured to the second output shaft and incorporated into the differential means, and
         a seventh bevel gear freely rotatable about the second output shaft, the seventh bevel gear cooperating with the first bevel gear secured to the input shaft, the seventh bevel gear being secured to a planet carrier cage of the differential means, the planet carrier cage of the differential means comprises at least one eighth bevel gear mounted secured to an axis perpendicular to the output shafts and cooperating simultaneously with the fifth and sixth bevel gears, the planet carrier cage of the differential means being mounted freely rotatable about the first output shaft and second output shaft, wherein the ring gear is secured to the third bevel gear freely rotatable about the input shaft, rotation of the third gear modulating the relative speeds of rotation of the first and second output shafts which are also driven in rotation by the differential means.

2. The differential steering system according to claim 1, wherein the rotation and the direction of rotation of the planet carrier are controlled by a motor.

3. The differential steering system according to claim 2, wherein said motor is an electric, hydraulic or pneumatic motor.

4. The differential steering system according to claim 1, wherein the dimensions of the different gears are selected so that the planet carrier is substantially stationary when the first and second output shafts have identical direction and speed of rotation.

5. The differential steering system according to claim 1, wherein the dimensions of the first, second, third, fourth and seventh gears and of the ring gear are selected to satisfy approximately +/−N % the following equation: $Z_2 \cdot Z_9 \cdot Z_5 = Z_1 \cdot Z_6 \cdot Z_4$ with $Z_1$ the number of teeth of the first gear
$Z_2$ the number of teeth of the second gear
$Z_4$ the number of teeth of the ring gear
$Z_5$ the number of teeth of the third gear
$Z_6$ the number of teeth of the fourth gear
$Z_9$ the number of teeth of the seventh gear
N being less than or equal to 10%.

* * * * *